United States Patent [19]

Hand et al.

[11] Patent Number: 4,716,824
[45] Date of Patent: Jan. 5, 1988

[54] FOOD MARINATOR

[75] Inventors: George E. Hand, Excelsior; Roman A. Kramer, Bloomington, both of Minn.

[73] Assignee: Interplastic Corporation, Minneapolis, Minn.

[21] Appl. No.: 768,744

[22] Filed: Aug. 23, 1985

[51] Int. Cl.$^4$ .......................... A23B 4/00; B01D 23/06
[52] U.S. Cl. ........................................ 99/516; 68/197; 99/534; 134/135; 210/455; 210/474
[58] Field of Search ................ 99/485, 495, 516, 534, 99/535, 536, 410, 413; 210/455, 498, 469, 464, 465, 470–479; 126/369; 134/135; 68/197; 206/363–370; 422/300

[56] References Cited

U.S. PATENT DOCUMENTS

| | | | |
|---|---|---|---|
| 63,772 | 4/1867 | Whitney | 99/410 |
| 1,276,749 | 8/1918 | George | 126/369 X |
| 2,188,563 | 1/1940 | Anzalone | 99/413 |
| 4,053,280 | 10/1977 | Salisbury | 134/135 X |
| 4,265,766 | 5/1981 | Crossley | 210/474 X |
| 4,574,776 | 3/1986 | Hidle | 99/413 X |
| 4,604,989 | 8/1986 | Kita | 99/413 |

*Primary Examiner*—Timothy F. Simone
*Attorney, Agent, or Firm*—Kinney & Lange

[57] ABSTRACT

The present invention employs an arrangement of multiple containers for marinating food. The container arrangement includes an inner container having a bottom wall and side walls which define a food holding chamber. A plurality of apertures are provided in the bottom wall of the inner container for marinade to passage. The inner container further has a noncircular cross sectional configuration defining a plurality of bottom corners. An outer container similarly has a bottom wall and side walls defining a marinade holding chamber for holding a given level of marinade. The outer container is configured in to accept the inner container. Alternatively, the side walls support the inner container in an elevated position on rotation thereof relative to the outer containers.

6 Claims, 3 Drawing Figures

FOOD MARINATOR

BACKGROUND OF THE INVENTION

1. Field of the Invention

The present invention relates generally to a food marinator and, particularly, to a set of containers which are alternatively positionable, with respect to each other, in differing positions and relative orientations. One container position is a marinating position and the other a draining position.

2. Description of the Prior Art

Various container arrangements have been employed for marinating food. Typically, these arrangements include an outer receptacle for holding a given quantity of marinade and an inner fluid-permeable receptacle which holds the food to be marinated. The inner receptacle is dimensioned to be disposed within the outer receptacle and allows marinade to enter to marinate the food contained therein. After a desired marinating interval, the inner receptacle may be held above the marinade bath to allow marinade to drain from the inner receptacle into the outer receptacle. It is a common practice to employ supports carried by the inner receptacle to support that receptacle on the outer receptacle for drainage. The inclusion of such supports adds to the cost of manufacturing and may render the use of the marinator cumbersome.

Representative of the arrangement discussed above are U.S. Pat. Nos. 4,265,766 to Crossley; U.S. Pat. No. 226,940 to Lax; and U.S. Pat. No. 462,076 to Devoll. In addition, U.S. Pat. No. 261,142 to Dorsch et al. describes a food strainer and steamer having adjustable support flanges for holding the strainer at a selected depth within an outer container. Adjustment of the support flanges is time consuming and cumbersome, particularly when the strainer is filled with food.

SUMMARY OF THE INVENTION

The food marinator of the present invention includes a first container having a chamber for holding food to be marinated. At least a portion of the container is permeable to allow marinade to enter. The first container has a noncircular cross-sectional configuration.

A second container defines a chamber for holding a predetermined level of marinade. The second container alternatively supports the first container in a marinating position and a draining position. In the marinating position, the first container is aligned in a first angular orientation with respect to the second container and is disposed within the marinade holding chamber to allow marinade within the second container to enter. In the draining position, the first container is aligned in a second angular orientation with respect to the second container and is supported by the walls of the second container above the predetermined marinade level. Marinade in the food holding chamber of the first container drains into the second container when the first container is in the draining orientation.

DETAILED DESCRIPTION OF THE PREFERRED EMBODIMENTS

Figures 1, 2, 3:
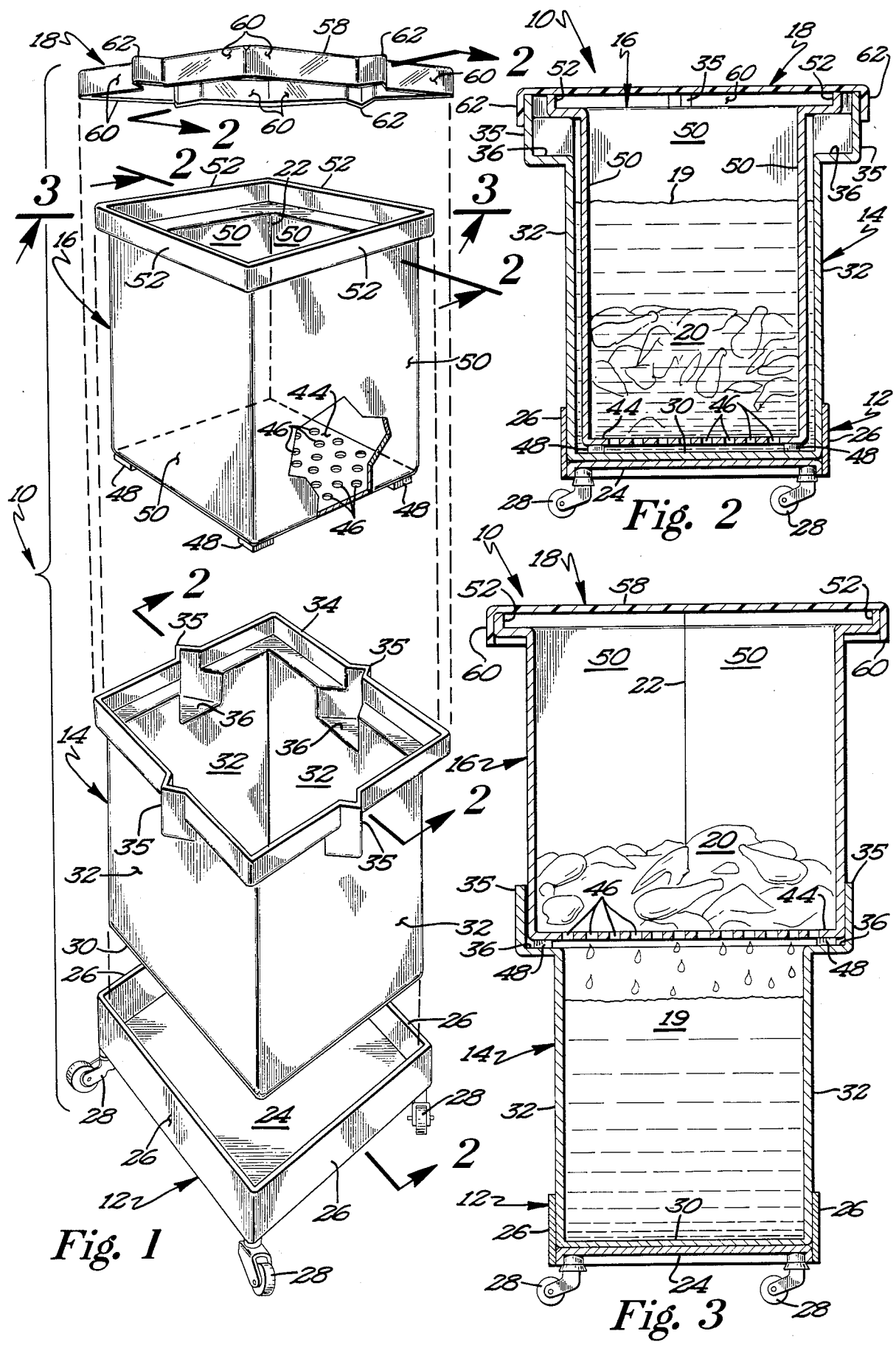
FIG. 1 is an exploded view of a marinating container arrangement in accordance with the present invention.
FIG. 2 is a sectional view of the container arrangement of the present invention taken along the line 2—2 of FIG. 1 with the first container in marinating position with respect to the second container.
FIG. 3 is a sectional view of the container arrangement of the present invention taken along the line 3—3 of FIG. 1 with the first container in draining position with respect to the second container.

A preferred embodiment of the container arrangement or "marinator" of the present invention is generally indicated at 10 in FIG. 1. The marinator 10 includes a base 12, a marinade holding (outer) container 14, a fluid permeable food holding (inner) container 16 and a cover 18.

The marinade holding container 14 is supported on the base 12, and is arranged to support the food holding container 16 between a food marinating position, as shown in FIG. 2, and a draining position, as shown in FIG. 3. In the marinating position (FIG. 2), marinade 19 within the container 14 enters the food holding container 16 to marinate food 20 contained therein. In the draining position (FIG. 3), the marinade 19 within the food holding container 16 drains from the container 16 into the marinade holding container 14. In both the marinating and draining positions, the base 12, the marinade holding container 14, the food holding container 16 and the cover 18 are generally aligned along a vertical axis 22 (see FIG. 3) of the marinator 10. However, the containers 14 and 16, as well as the cover 18, are disposed at different angular orientations with respect to each other in the two positions.

The base 12 includes a bottom wall 24, side walls 26 and a caster assembly 28. The side walls 26 extend upwardly from the bottom wall 24 to define an open ended shallow box having a generally square cross sectional configuration which is arranged to receive and support the marinade holding container 14. The casters 28 extend from each corner of the bottom wall 24 to support the base 12 for movement across a support surface such as a floor, for example.

The marinade holding container 14 includes a bottom wall 30, side walls 32, each terminating at a rim 34, and four corners 35 within the side walls 32/rims 34. Each of the corners 35 has a support surface 36. The side walls 32 extend upwardly from the bottom wall 30 to define an open ended container having a substantially square cross sectional configuration with a chamber defined along the vertical axis 22. In use, the chamber of container 14 holds a predetermined level of marinade 19 (see FIGS. 2 and 3).

The support surfaces 36 support the food holding container 16 in the draining position, as shown in FIG. 3. The food holding container 16 includes a bottom wall 44 having a plurality of openings or apertures 46, spacers or feet 48 and side walls 50, each side wall 50 terminating at a rim 52. The side walls 50 extend upwardly from the bottom wall 44 to define an open-ended container that is generally square in cross-section and which is configured to nest within the container 14 in the marinating position or orientation. The feet 48 support the bottom wall 44 in spaced relation with the support surfaces 36 in the draining position or orientation.

The cover 18 includes a top wall 58 and side walls 60 having positioning corner flanges 62 intermediate the corners of the cover 18.

In the marinating position, the food holding container 16 is aligned in a first angular orientation with respect to the marinade holding container 14, as illustrated in FIGS. 1 and 2. In this orientation, the food holding container 16 nests within the marinade holding chamber of the container 14. The spacers 48 rest on the bottom wall 30 of openings of containers 14 and 16. Marinade 19 within the marinade holding container 14 enters the food holding container 16 through openings 46 in its bottom wall 44, to marinate the food 20 therein. The spacers 48 facilitate marinade flow into the container 16. As illustrated, the flanges 62 of cover 18 mate with the rim 52 of the container 16 such that the top of both the marinade holding container 14 and the food holding container 16 are closed.

In the draining position, the food holding container 16 is aligned in a second position or angular orientation with respect to the marinade holding container 14, as shown in FIG. 3. In the illustrated embodiment, the second angular orientation is approximately 45° from the first angular orientation. In the second orientation, the food holding container 16 is supported on the support surfaces 36 of the marinade holding container 14. The marinade 19 within the food holding container 16 drains through the openings 46 in the bottom wall 44 into the marinade holding chamber of the container 14. The cover 18 is oriented so that the positioning flanges 62 mate with the rim 52 of the food holding container 16 to close the top of the food holding container 16 as illustrated in FIG. 3. The orientation of the cover 18 with respect to the food holding container 16 in the draining position is approximately 45° from its orientation with respect to the food holding container 16 in the marinating position.

The components of the marinator 10, including the base 12, the marinade holding container 14, the food holding container 16 and the cover 18, may be constructed of plastic, as by a molding operation. Other suitable materials and forming techniques may be used. Molding materials suitable for use with food are relatively inexpensive and are readily formed in the configurations shown in FIGS. 1-3, as well as being strong and durable.

The rims 34 and 52 and corners 35 of the marinade holding container 14 are integrally molded into the side walls of their respective containers. The illustrated arrangement substantially "locks" the food holding container 16 in place against rotation in both the marinating and draining position. The rim 52 of the food holding container 16 is dimensioned to mate with the rim 34 of the marinade holding container 14 in the marinating position. The corners of rim 52 overlie the flanges 62 of cover 18 when the cover 18 is disposed in closing relationship with the food holding container 16, as shown in FIG. 3.

As described, it is preferred that both the food holding container 16 and the marinade holding container 14 have substantially square cross sectional configurations. Such a configuration provides a plurality of marinating and draining positions (each 45° apart). The four support surfaces 36 also provide stability in supporting the food holding container 16. However, while a square cross sectional configuration is preferred, it should be understood that other noncircular cross sectional configurations can be employed to achieve the advantages of the present invention, and their use is contemplated. Thus, a food holding container can be provided which has a cross section which will mate within or nest in the marinade holding container in a first angular orientation, and not mate within or nest in at least a second angular orientation. Thus, a food holding container in accordance with the present invention can be supported directly on the side walls of the marinade holding container in the draining position, without the need for the supports used by prior art marinating systems. Also, cross sectional configurations which are symmetric about the vertical axis 22 are preferred.

It should be noted that the engaging surfaces 36 support the bottom wall 44 of the food holding container 16 below an uppermost edge of the rim 34 of the marinade holding container 14. Since the openings 46 are located in the bottom wall 44 of the food holding container 16, marinade 19 draining from the food holding chamber will be dispensed back into the marinade holding chamber, with little chance for accidental spillage outside of the perimeter of the marinade holding container 14.

Although the present invention has been described with reference to preferred embodiments, workers skilled in the art will recognize that changes may be made in form and detail without departing from the spirit and scope of the invention.

What is claimed is:

1. A marinator for marinating food comprising:
    a food holding container of non-circular cross section having a bottom wall, side walls extending upwardly from each side of the bottom wall in adjoining relation and a
    plurality of bottom corners, the bottom wall having a plurality of openings for marinade passage; and
    a marinade holding container of non-circular cross section having a bottom wall and side walls extending upwardly from each side of the bottom wall in adjoining relation and defining a chamber for holding a predetermined level of marinade, the side walls of the marinade holding container being further arranged to alternatively support the food holding container in a nested marinating position within the marinade holding chamber and a non-nested draining position above the predetermined level of marinade and substantially out of said chamber and including a plurality of support surfaces each of which project away from said chamber, said support surfaces being arranged to engage a bottom corner of the food holding container when in the drawing position, the food holding container and the marinade holding container being aligned in different angular orientations with respect to each other when in the marinating and in the draining positions.

2. The marinator of claim 1 wherein the food holding container and the marinade holding container have cross sectional configurations which are symmetrical about an axis.

3. The marinator of claim 2 wherein the food holding container and the marinade holding container are each integrally molded of plastic and the support surfaces are integrally molded into the side walls of the marinade holding container.

4. The marinator of claim 3 wherein the marinade holding container and the food holding container each have a rim, and further comprising a cover integrally molded of plastic and configured to be selectively mounted on the rim of the food holding container and the rim of the marinade holding container.

5. The marinator of claim 1 wherein the food holding container and marinade holding container have a generally square cross sectional configuration and four bottom corners, the side walls of the marinade holding container defining support surfaces arranged to engage the bottom corners of the food holding container to support the food holding container in the draining position.

6. The marinator of claim 5 wherein the orientation of the food holding container with respect to the marinade holding container in the marinating position is rotated approximately 45° from the orientation of the food holding container with respect to the marinade holding container in the draining position.

* * * * *